(12) United States Patent
Iwata

(10) Patent No.: US 6,371,071 B1
(45) Date of Patent: Apr. 16, 2002

(54) BALANCE SHAFT HOUSING

(75) Inventor: Kazuyuki Iwata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/653,333

(22) Filed: Aug. 31, 2000

(30) Foreign Application Priority Data

Sep. 3, 1999 (JP) ............................................. 11-250537

(51) Int. Cl.$^7$ ................................................. F02B 75/06
(52) U.S. Cl. .................................. 123/192.2; 123/196 R
(58) Field of Search .......................... 123/196 R, 192.2, 123/198 C

(56) References Cited

U.S. PATENT DOCUMENTS 5,791,309 A * 8/1998 Yamazaki et al. ......... 123/192.2

FOREIGN PATENT DOCUMENTS

| EP | 0 789 164 A1 | 8/1997 |
|---|---|---|
| EP | 0 789 165 A1 | 8/1997 |
| EP | 0 789 166 A1 | 8/1997 |
| EP | 0 979 957 A2 | 2/2000 |
| JP | 05-39233 | 10/1993 |
| WO | WO 00/15976 | 3/2000 |

* cited by examiner

*Primary Examiner*—Noah P. Kamen
(74) *Attorney, Agent, or Firm*—Armstrong, Westerman & Hattori, LLP

(57) ABSTRACT

A balance shaft housing (an upperhousing 14U and a lower housing 14L) disposed in an oil pan (7) for accommodating balance shafts (13L, 13R) provided with counterweights (19) for canceling out the vibromotive force caused by pistons, characterized in that an intake passage (an intake pipe 32) of a pump (27) for taking in lubricating oil within the oil pan is formed integrally with the housing, and that an oil strainer attaching portion (34) is formed integrally with a bearing wall (a first bearing wall 26) for supporting the balance shafts. According to this construction, since the thickness of the oil strainer attaching portion increases the rigidity of the bearing wall supporting the balance shafts, the increase in rigidity of the housing can be attained without increasing the thickness of the housing.

32 Claims, 8 Drawing Sheets

BALANCE SHAFT HOUSING

BACKGROUND OF THE INVENTION

1. Field of the Invention

The present invention relates to a balance shaft housing, and more particularly to a housing for accommodating balance shafts provided with counterweights for canceling out the vibromotive force caused by pistons.

2. Description of the Related Art

For example, JP-B-5-39233U discloses a balancing device in which balance shafts provided with counterweights for canceling out the secondary vibromotive force generated by pistons of an engine are disposed below a crankshaft within an oil pan and in which the rotation of the crankshaft is transmitted to the balance shafts via a chain/sprocket mechanism or a gear mechanism.

With this balancing device, if the balance shafts vibrate, the damping effect deteriorates. Therefore, the housing for rotatably supporting the balance shafts needs as high rigidity as possible.

However, if the thickness of the whole housing is increased in order to increase the rigidity of the housing, the housing would need to be enlarged. This modification detracts from the goal of reducing the weight of the engine.

SUMMARY OF THE INVENTION

The invention was made to solve the problem inherent in the related art, and a primary object thereof is to provide a balance shaft housing which is constructed so as to increase the rigidity thereof without causing a weight increase or complicated construction.

In view of the above object, according to the invention, there is provided a balance shaft housing (an upper housing 14U and a lower housing 14L) disposed in an oil pan (7) for accommodating balance shafts (13L, 13R) provided with counterweights (19) for canceling out the vibromotive force caused by the pistons, wherein an intake passage (an intake pipe 32) of a pump (27) for receiving lubricating oil within the oil pan is formed integrally with the housing, and an oil strainer attaching portion (34) is formed integrally with a bearing wall (a first bearing wall 26) for supporting the balance shafts.

According to this construction, since the thickness of the oil strainer attaching portion helps increase the rigidity of the bearing wall supporting the balance shafts, the increase in rigidity of the housing can be attained without increasing the thickness of the housing. Moreover, since the oil strainer is attached directly to the housing, it can help make the engine compact.

In particular, the intake passage and the oil strainer attaching portion are formed continuously along axes of the balance shafts, and a plurality of bearing walls for supporting the balance shafts are connected to each other by the intake passage and the oil strainer attaching portion. According to this construction, the rigidity at the bearing portions can increase further.

DETAILED DESCRIPTION OF THE PREFERRED EMBODIMENTS

Referring to the accompanying drawings, the invention will be described in detail below.

Figure 1:
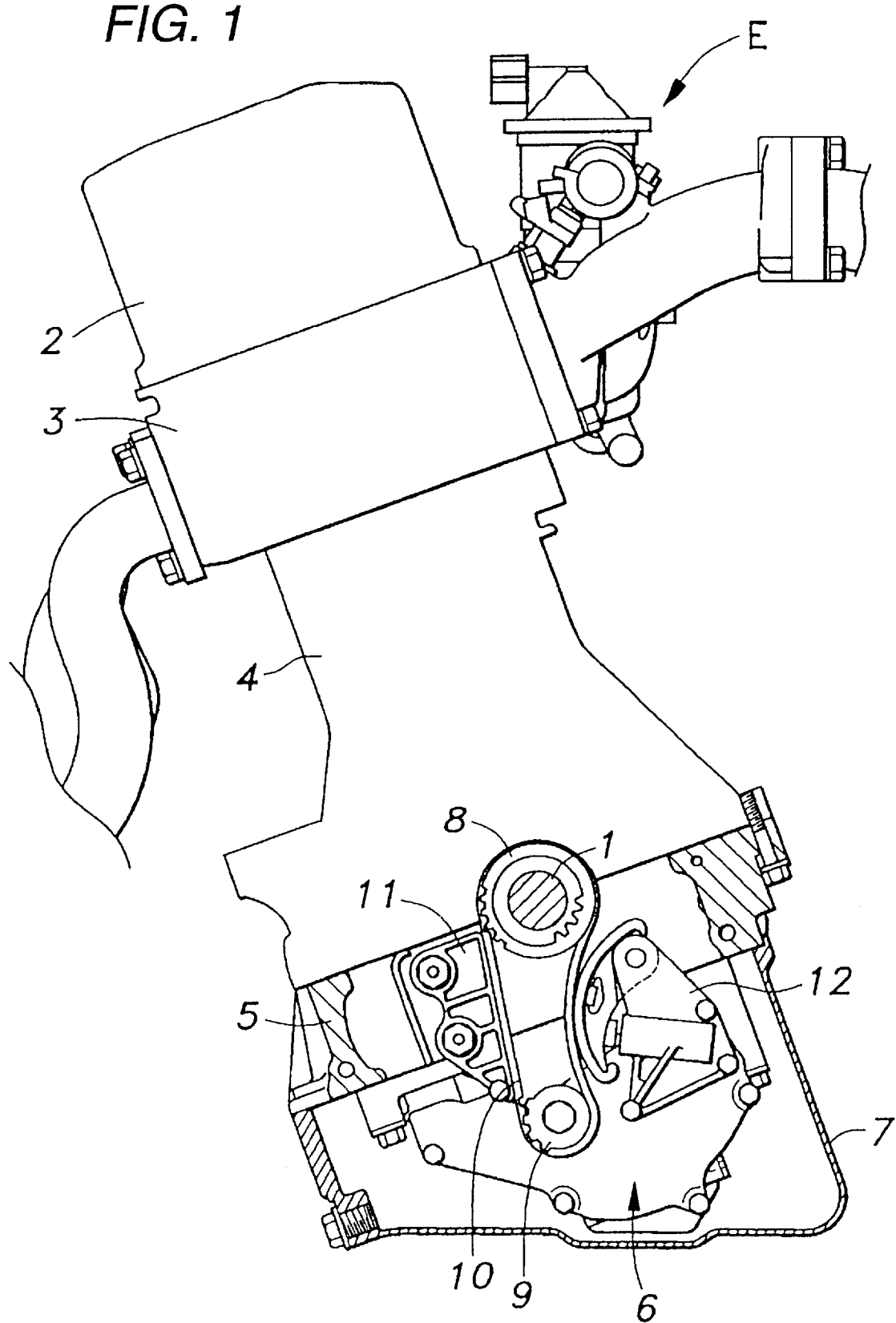
FIG. 1 is a front view of an engine to which the invention is applied, the engine being partially cut away to show a main part thereof.

FIG. 1 shows a reciprocating piston engine. This engine E is an inline four-cylinder engine in which a crankshaft 1 extends horizontally and comprises a head cover 2, a cylinder head 3, a cylinder block 4, a lower block 5, a balancing device 6 and an oil pan 7.

The balancing device 6 is intended to reduce a secondary vibration of the engine E generated by reciprocating motions of the pistons, and the device is bolted to a lower surface of the lower block 5 (below the crankshaft 1) within the oil pan 7. The balancing device 6 is constructed such that the rotation of the crankshaft 1 is transmitted to this balancing device 6 via a large sprocket 8 fixed to a front end portion of the crankshaft 1 (hereinafter, a crank pulley or chain case side is referred to as the front side), a small sprocket 9 fixed to a front end of a balance shaft (which will be described in detail later) on the left-hand side (hereinafter, lateral directions are determined when viewed as facing the crank pulley or chain case) and a endless link chain 10 extending between the large and small sprockets 8, 9.

Vibration of the endless link chain 10 is prevented by a chain guide 11 fixed to the front side of the lower block 5 leftward of the center of the crankshaft, and the appropriate tension is always applied to the endless link chain 10 by a chain tensioner 12 fixed to a front end of the balancing device 6 rightward next to the small sprocket 9.

Figure 2:
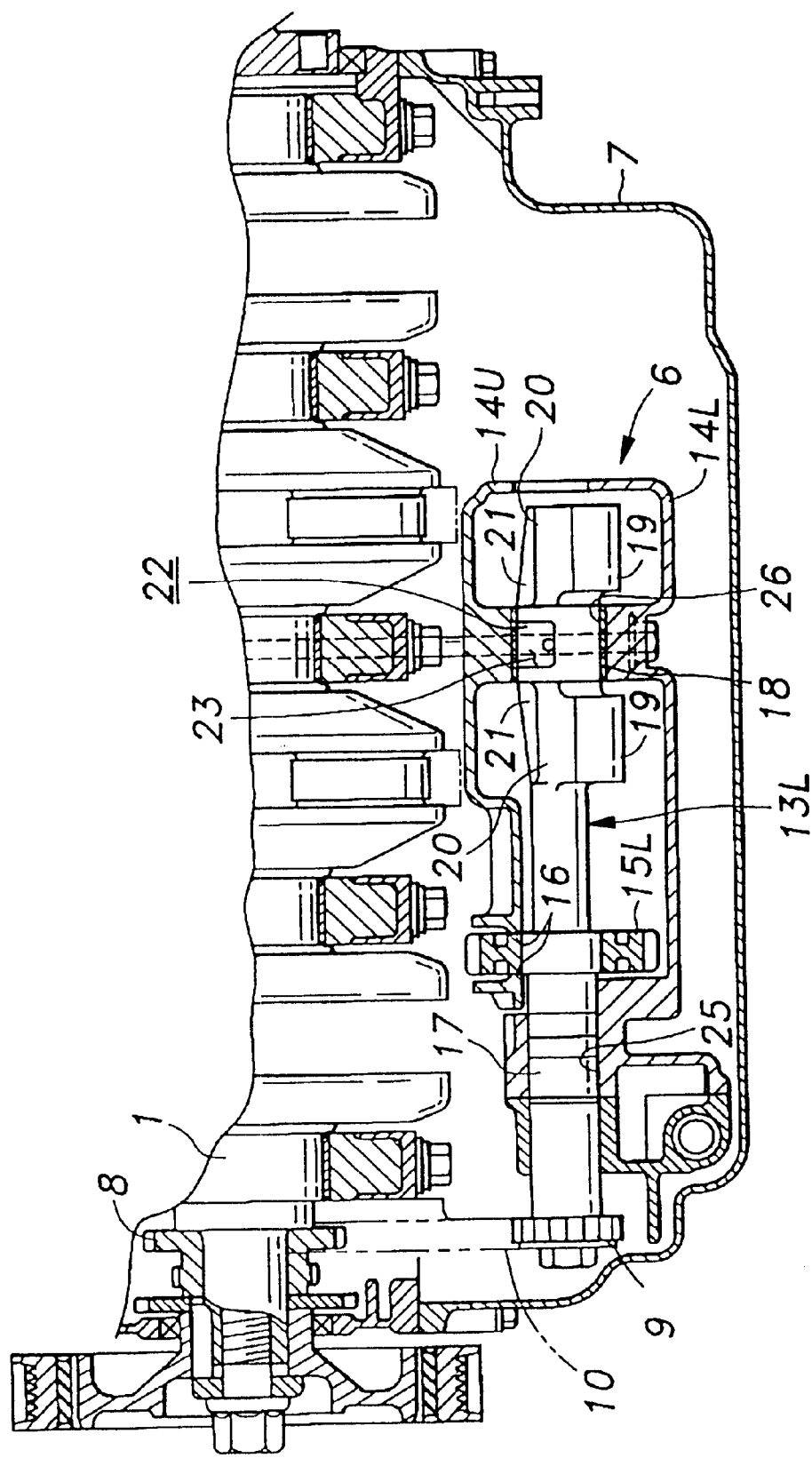
FIG. 2 is a partial longitudinal sectional view taken along an axial center of a left balance shaft to show the interior of an oil pan.
Figure 3:
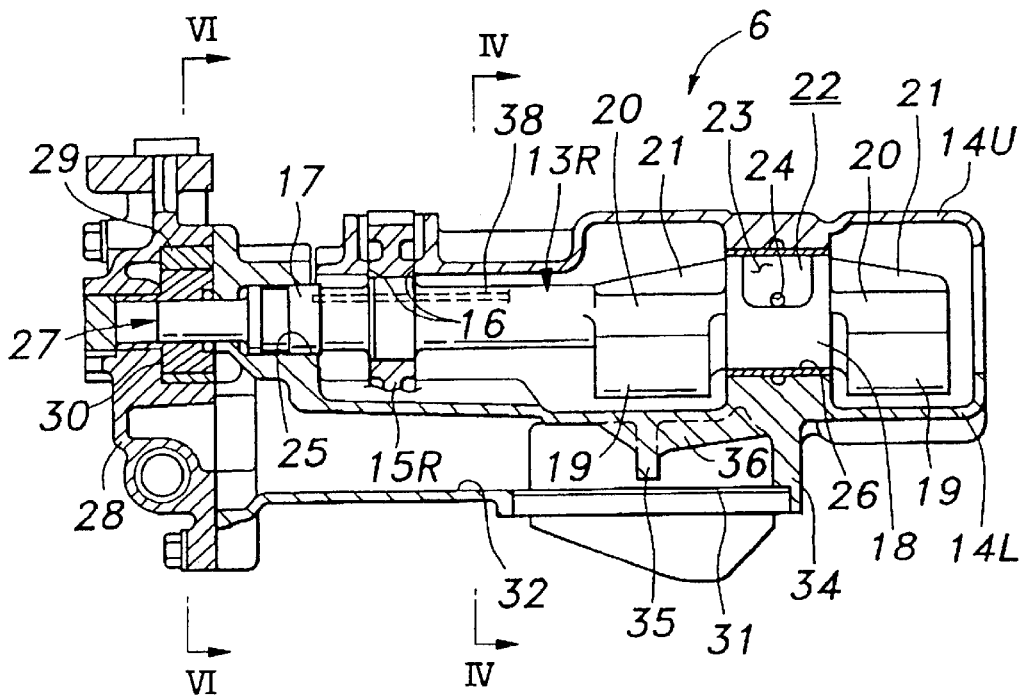
FIG. 3 is a longitudinal sectional view of a balancing device taken along an axial center of a right balance shaft.
Figure 4:
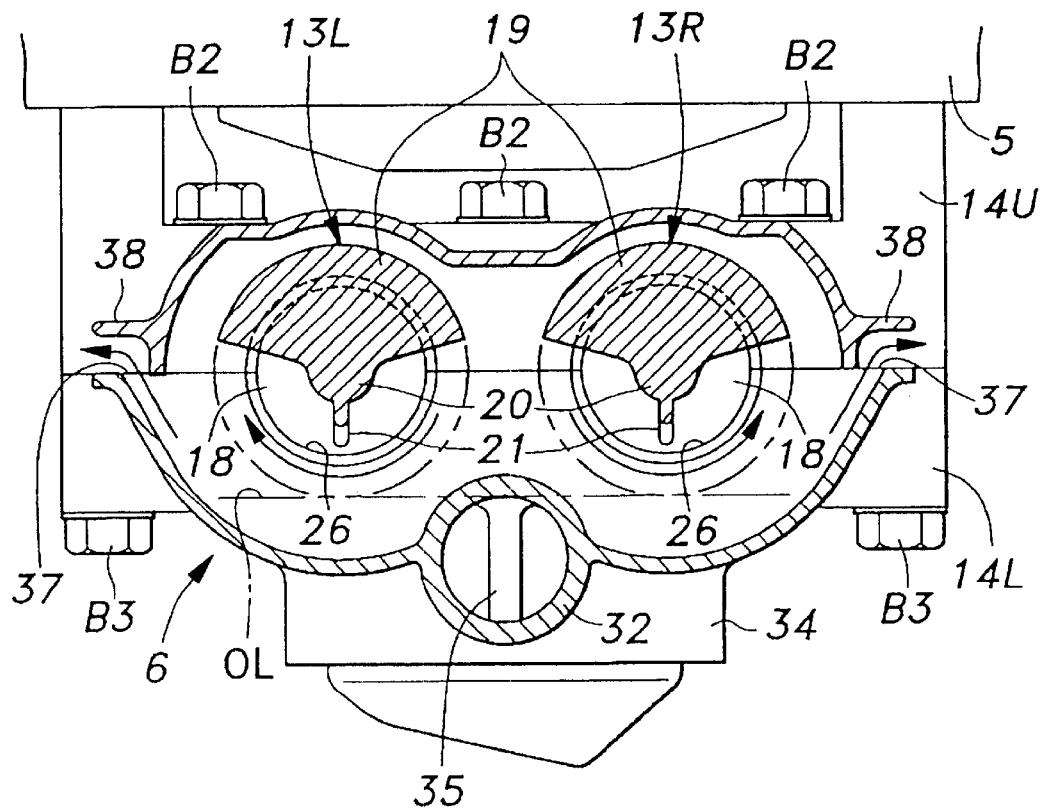
FIG. 4 is a cross-sectional view taken along the line IV—IV of FIG. 3 to show the main part.

As shown in FIGS. 2 to 4, the balancing device 6 comprises a pair of left and right balance shafts 13L, 13R, which are of substantially the same configuration, and an upper housing 14U and a lower housing 14L, which are divided vertically as two halves by a plane passing through centers of the two balance shafts 13L, 13R so that the balance shafts 13L, 13R can be supported in parallel with each other and thereby accommodated therein.

The two balance shafts 13L, 13R are interlockingly connected to each other with helical gears 15L, 15R which are connected integrally with the balance shafts 13L, 13R, respectively. Here, the driving force of the crankshaft 1 is transmitted to the left balance shaft 13L, as mentioned above, via the large sprocket 8, the endless link chain 10 and the small sprocket 9. The left balance shaft 13L is thereby driven to rotate at twice the speed of crankshaft 1 in the same direction as that of the crankshaft 1, and the right balance shaft 13R is driven to rotate in an opposite direction through mesh engagement of the helical gears 15L, 15R.

As shown in FIGS. 2 and 3, a thrust bearing wall 16 is formed on the upper housing 14U at portions corresponding to the helical gears 15L, 15R, the thrust bearing wall 16 having thrust receiving faces adapted to abut the axial end faces of the respective helical gears 15L, 15R, which are made integral with the respective balance shafts 13L, 13R. These portions open upwardly, and parts of the outer circumferences of the two helical gears 15L, 15R are always exposed to the oil pan so that lubricating oil dropping from above or flying within the oil pan 7 penetrates the mesh engagement portion between the two helical gears 15L, 15R and the thrust bearing wall 16, whereby those portions are sufficiently lubricated.

First journal portions 17, each having a relatively small diameter, and second journal portions 18, each having a relatively large diameter, are integrally formed on front and rear ends of the respective balance shafts 13L, 13R. Additionally, counterweights 19 are also integrally formed on the rear ends of the respective balance sharts 13L, 13R in such a manner that the counterweights 19 are each divided into two halves, one positioned before and one positioned after the second journal portions 18. The position of the gravity of the counterweight 19 is offset radially outwardly from the rotational center thereof, and the diameter of its rotational locus is made larger than the diameter of the second journal portion 18 (refer to FIG. 4).

A shaft portion 20 of the counterweight 19 is made thin in order to obtain an originally designed equivalent rotational mass with a counterweight 19 which is made as small as possible. Then, in order to compensate for a reduction in rigidity resulting from the smaller diameter, tapered ribs 21 connecting to axial end faces of the second journal portion 18 are provided on a side opposite to the counterweights 19 of two shaft portions 20 holding the second journal portion 18 longitudinally therebetween.

Figure 5:
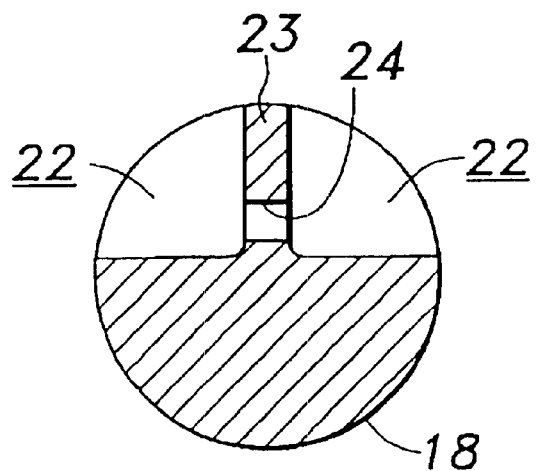
FIG. 5 is a cross-sectional view of a second journal portion of the balance shaft taken along a plane intersecting an axis of the second journal portion.

In addition, in order to make the counterweight 19 even more small by offsetting the position of the gravity of the second journal portion 18 toward the counterweight 19 side, extra metal is cut away from a side of the second journal portion 18 which is opposite to where the counterweight 19 is formed, in such a manner that only axial ends of the second journal portion 18 remain. Then, a rib 23 extending along a plane through which the central axis of the second journal portion 18 passes is provided so as to extend over a space 22 produced between the axial ends of the second journal portion 18 after the extra metal has been cut away in order to compensate for a reduction in bending rigidity resulting from the cutting away of the extra metal (refer to FIG. 5). Note that the rib 21 provided on the shaft portion 20 of the counterweight 19 and the rib 23 provided on the second journal portion 18 are configured so as to extend along the same plane.

Through this construction, the shaft end portions of the second journal portion 18 on the opposite side of the counterweight are allowed to come into contact with an inner circumferential surface of a metal bearing, which will be described later, and therefore there is no risk of oil film breakage notwithstanding the fact that a contact area of the second journal portion 18 with the bearing hole is made smaller, and this contributes to the reduction in rotational resistance.

Note that a through hole 24 establishing a communication between sides of the rib 23 is formed in the rib 23 on an axial center side thereof, so as to facilitate the flow of lubricating oil within the space 22 resulting from the cutting away of the extra metal thereat, whereby the lubricating oil does not remain within the space to increase rotational resistance.

Conversely, the first journal portions 17 of the respective balance shafts 13L, 13R are supported on a first bearing wall 25 provided integrally with a front wall of the lower housing 14L. Then, the second journal portions 18 of the respective balance shafts 13L, 13R are supported on a second bearing wall 26 provided with a two-part metal bearing which is formed by connecting both the upper and lower housings 14U, 14L.

To accommodate the two balance shafts 13L, 13R in the two housings 14U, 14L, the front ends of the two balance shafts 13L, 13R are inserted into holes formed in the first bearing wall 25, which is made integral with the lower housing 14L, so that the respective first journal portions 17 are allowed to be supported on the first bearing wall 25, and the second journal portions 18 of the respective balance shafts 13L, 13R are allowed to rest on a half-divided portion on the lower housing side 14L of the second bearing wall 26 in which a two-part metal bearing is provided. Then, in this state of the other half-divided portion on the upper housing 14U side of the second bearing wall 26 being aligned with the second journal portions 18 of the respective balance shafts 13L, 13R, the upper and lower housings 14U, 14L are joined to each other, whereby the two balance shafts 13L, 13R are rotatably accommodated in the two housings 14U, 14L.

This construction obviates the necessity of putting the counterweight 19 through the bearing hole, and therefore the respective journal portions 18, 19 can be thinned while maintaining sufficient strength, thereby making it possible to reduce the rotational resistance. Moreover, the miniaturization and weight reduction of the housings 14U, 14L which accommodate the balance shafts 13L, 13R can increase further.

Figure 6:
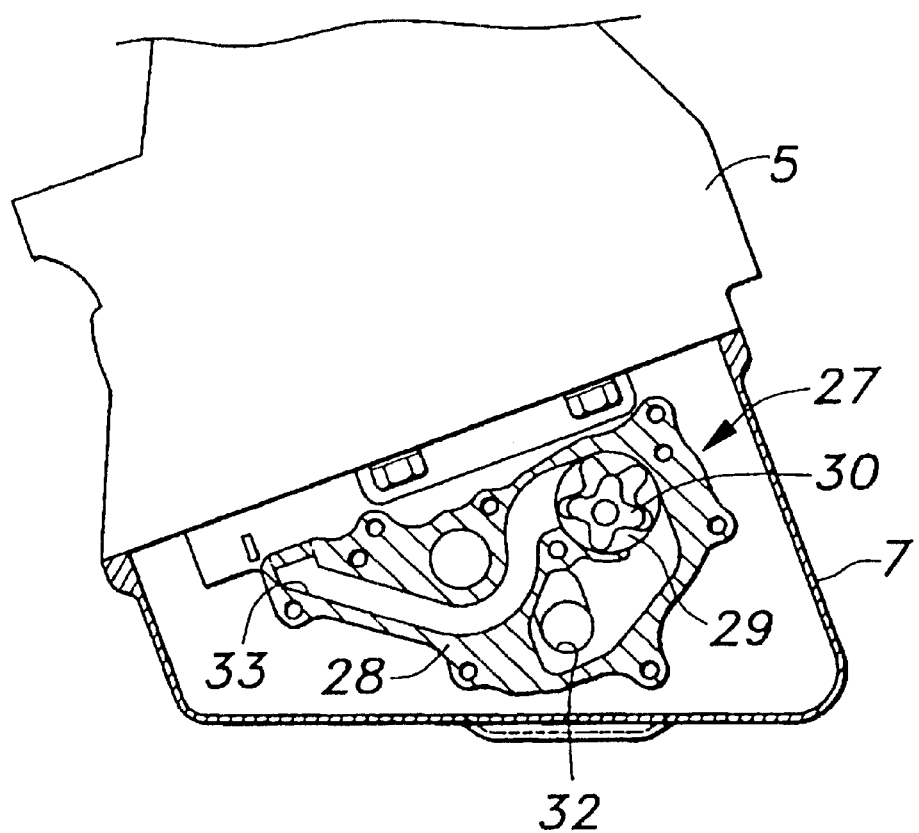
FIG. 6 is a cross-sectional view taken along the line VI—VI of FIG. 3 to show the main part.

As shown also in FIG. 6, a trochoidal lubricating oil pump 27 is provided on the front end faces of the upper and lower housings 14U, 14L for distributing lubricating oil under pressure to respective portions of the engine. This lubricating oil pump 27 comprises an outer rotor 29 received in a pump housing 28 bolted to the front end faces of both the housings 14U, 14L and an inner rotor 30 connected to the front end of the right balance shaft 13R. Then, the inner rotor 30 adapted to rotate together with the right balance shaft 13R is constructed so as to distribute under pressure, in cooperation with the outer rotor 29, lubricating oil in the oil pan 7 which has been taken in from the oil strainer 31 attached to a bottom wall of the lower housing 14L via an intake pipe 32 formed integrally with the bottom wall of the lower housing 14L, to respective portions of the engine via a lubricating oil discharge path 33 connected to lubricating oil paths (not shown) formed in the lower block 5 and the cylinder block 4.

As shown in FIG. 3, an attaching boss 34 for the oil strainer 31 is connected to the half-divided portion of the second bearing wall 26 at a longitudinally intermediate portion of the lower housing 14L. The intake pipe 32 formed integrally with the lower surface of the lower housing 14L terminates in the vicinity of the frontward first bearing wall 25. The attaching boss 34 for the oil strainer 31 and the hollow intake pipe 32 are formed integrally in such a manner that they continuously align with each other at a position between the two balance shafts 13L, 13R on the lower surface of the lower housing 14L. Thus, since this construction allows in particular the plurality of bearing walls (25, 26) of the lower housing 14L which support the front and rear ends of the balance shafts 13L, 13R to be connected by the attaching portion 34 for the strainer 31 and the intake pipe 32, the construction considerably contributes to enhancing the rigidity of these bearing walls (25, 26).

Note that the intake pipe 32 partially protrudes into an area between the two balance shafts 13L, 13R (refer to FIG. 4). This helps reduce the downward extent of the intake pipe. In addition, since the oil strainer 31 is attached directly to the bottom wall of the lower housing 14L, it is unnecessary to enlarge the lower housing 14L. Thus, this construction contributes to making the engine compact.

A pin-like projection 35 is provided so as to extend toward a bottom surface of an intake port at which the oil strainer 31 comprising a metal screen is provided, so that the inward deformation of the oil strainer 31 can be suppressed. This projection 35 and the inner circumferential surface of the strainer attaching boss 34 are connected to each other by a rib 36, which helps further increase the rigidity of, in particular, the half-divided portion of the bearing wall 26 of the strainer attaching boss 34.

Respective end edges of left and right side walls of the upper housing 14U and the lower housing 14L which come into contact with the dividing plane between the two housings are, as shown in FIG. 4, offset from each other in the diametrical direction of the balance shafts 13L, 13R, whereby gaps 37 opening upwardly are formed in a plane passing through the centers of the two balance shafts 13L, 13R. Lubricating oil OL accumulating in the bottom of the lower housing 14L is scooped up by the counterweight 19 as the two balance shafts 13L, 13R rotate (in directions as indicated by arrows) to thereby be discharged to the outside of the housings 14U, 14L from the gaps 37.

Eaves-like projecting portions 38 are provided on the left and right side walls of the upper housing 14U so as to extend longitudinally. These eaves-like projecting portions 38 confront the openings of the gaps 37 so as to prevent lubricating oil dropping from above from entering into the housings 14U, 14L.

Figure 7:
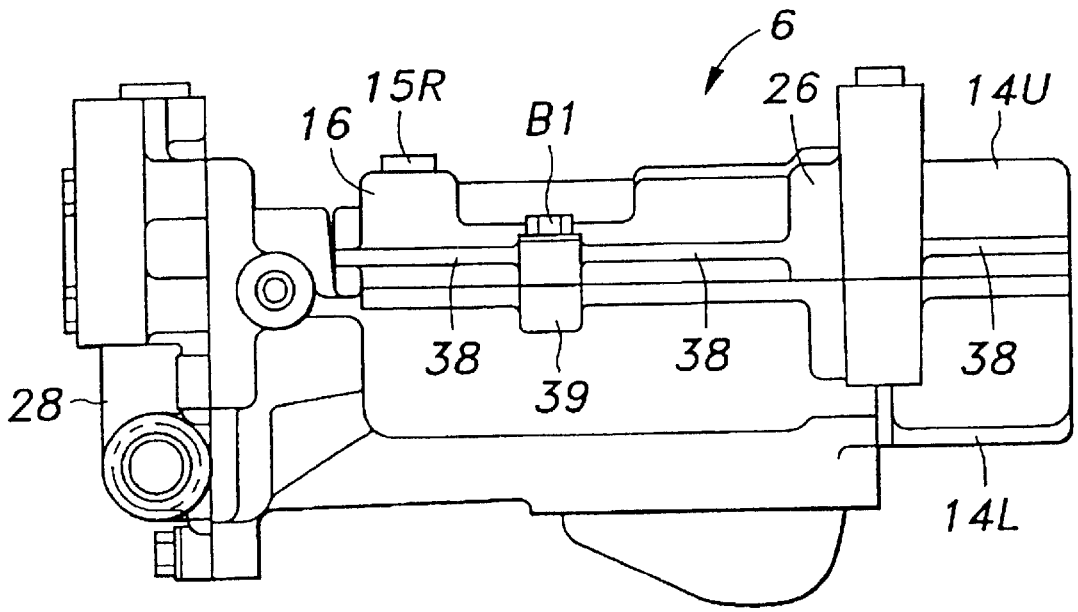
FIG. 7 is a right side view of the balancing device.
Figure 8:
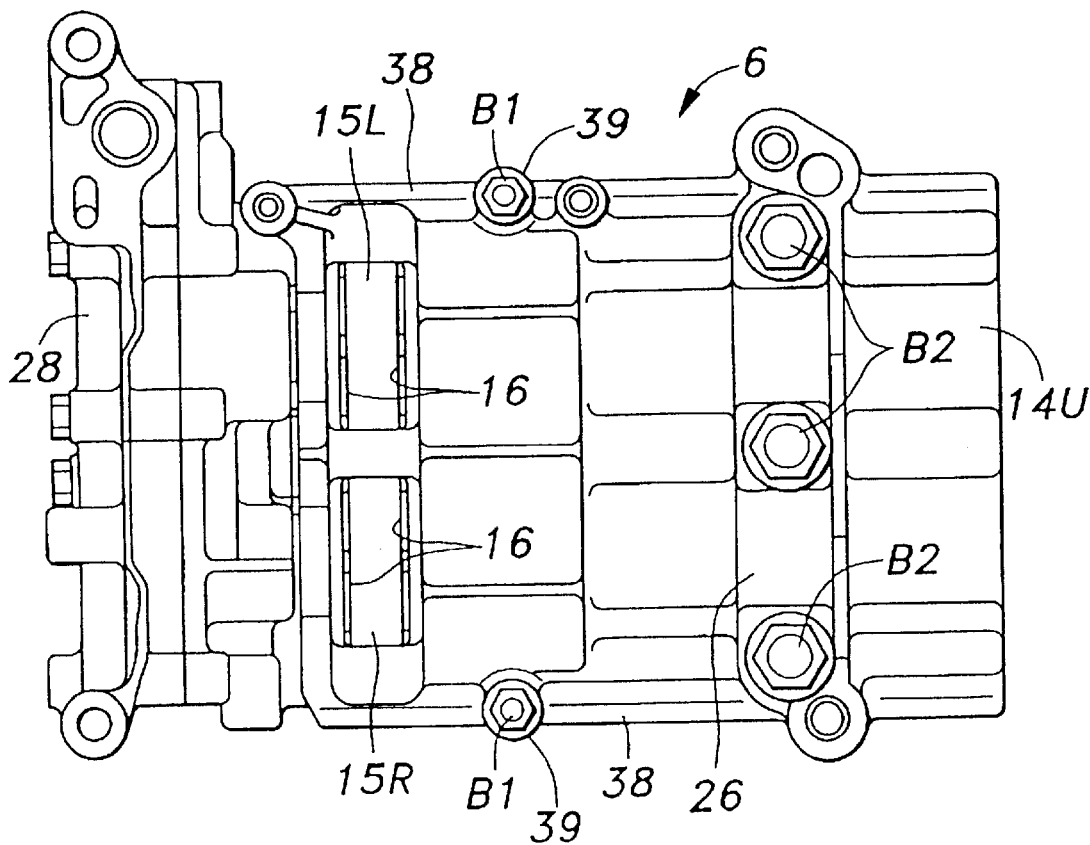
FIG. 8 is a top view of the balancing device.

As shown in FIGS. 7 and 8, these eaves-like projecting portions 38 are formed longitudinally along the fall length of the left and right side walls of the upper housing 14U, and connected to the eaves-like projecting portions 38 are boss portions 39 through which bolts B1 extend to fasten the upper and lower housings 14U, 14L together. The second bearing wall 26 and a thrust bearing wall 16 are adapted be brought into abutment with the helical gears 15L, 15R integrally connected to the respective balance shafts 13L, 13R for regulating axial positions thereof. Thus, the eaves-like projecting portions 38 contribute to enhancing the rigidity of the upper housing 14U.

Note that the upper and lower housings 14U, 14L are fastened together with three bolts B2 at the second bearing wall 26 where the second journal portions 18 are supported, so that looseness is unlikely at, in particular, the second bearing wall 26 where diametrical acceleration resulting from the rotation of the counterweight 19 is applied.

Figure 9:
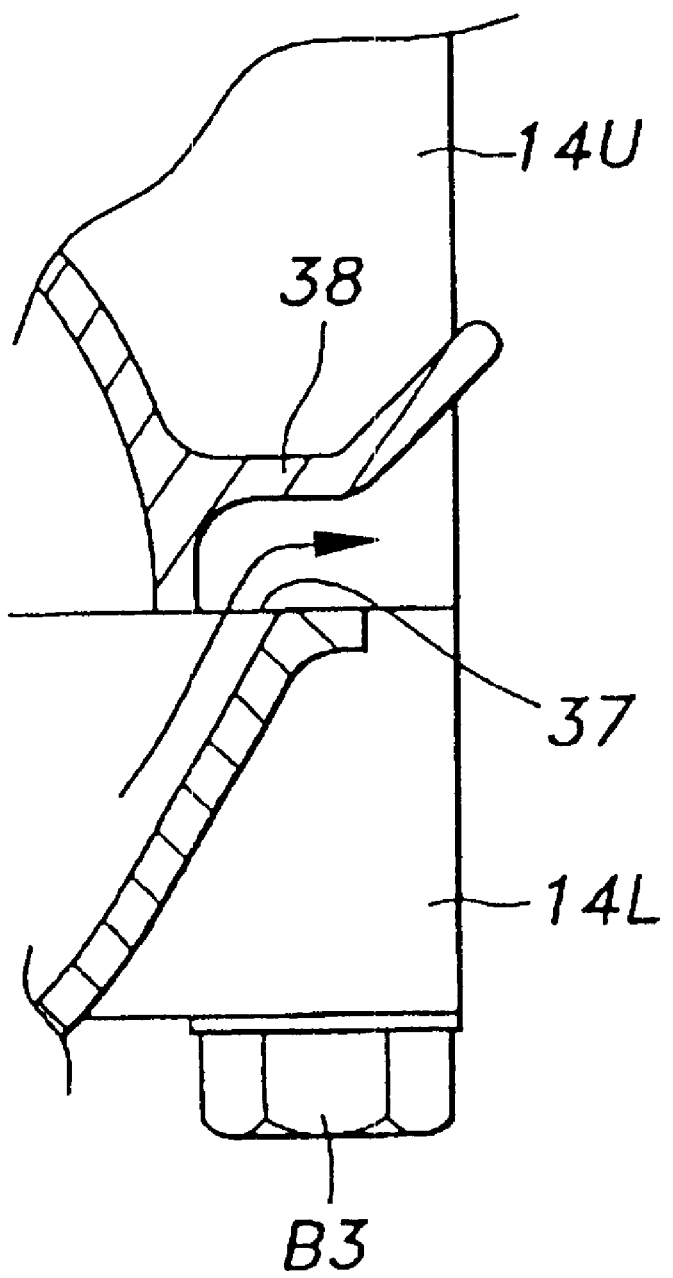
FIG. 9 is a partial vertical sectional view showing another form of an eaves-like projecting portion.

The eaves-like projecting portions 38 can function as a baffle plate for preventing the surface of lubricating oil within the oil pan from roughening, by allowing the eaves-like projecting portions 38 to extend laterally and to have a suitable cross-sectional configuration as shown in FIG. 9.

Figure 10:
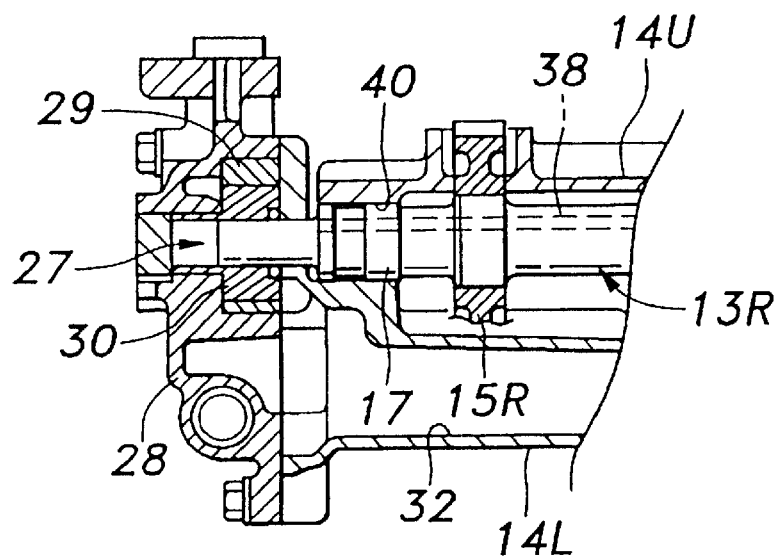
FIG. 10 is a partial longitudinal sectional view showing another form of a first journal portion.
Figure 11:
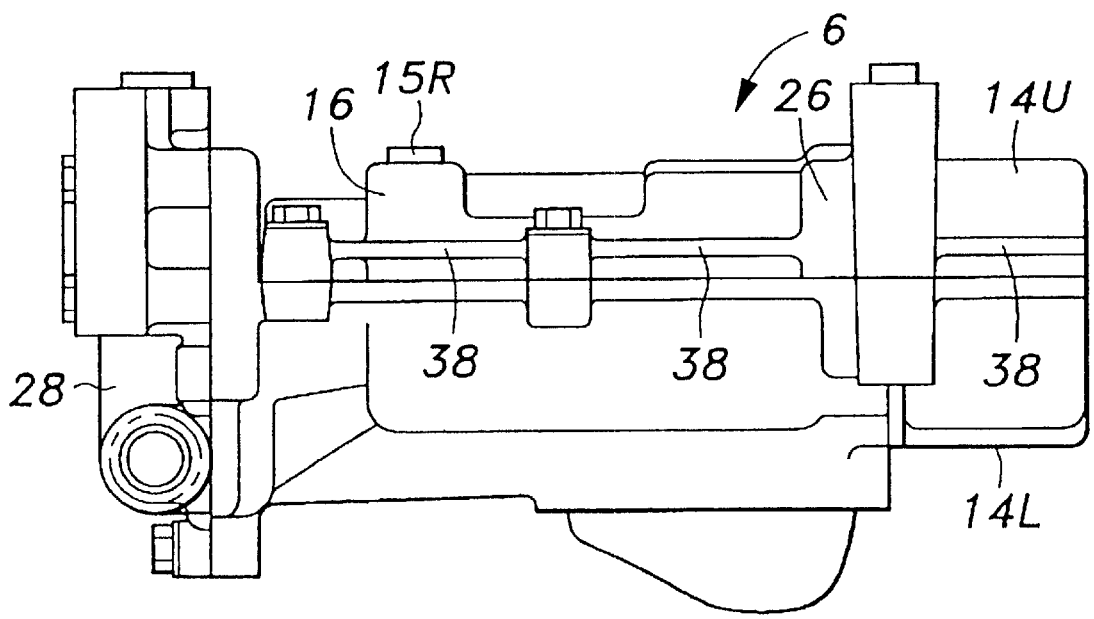
FIG. 11 is a right side view showing another form of a balancing device.
Figure 12:
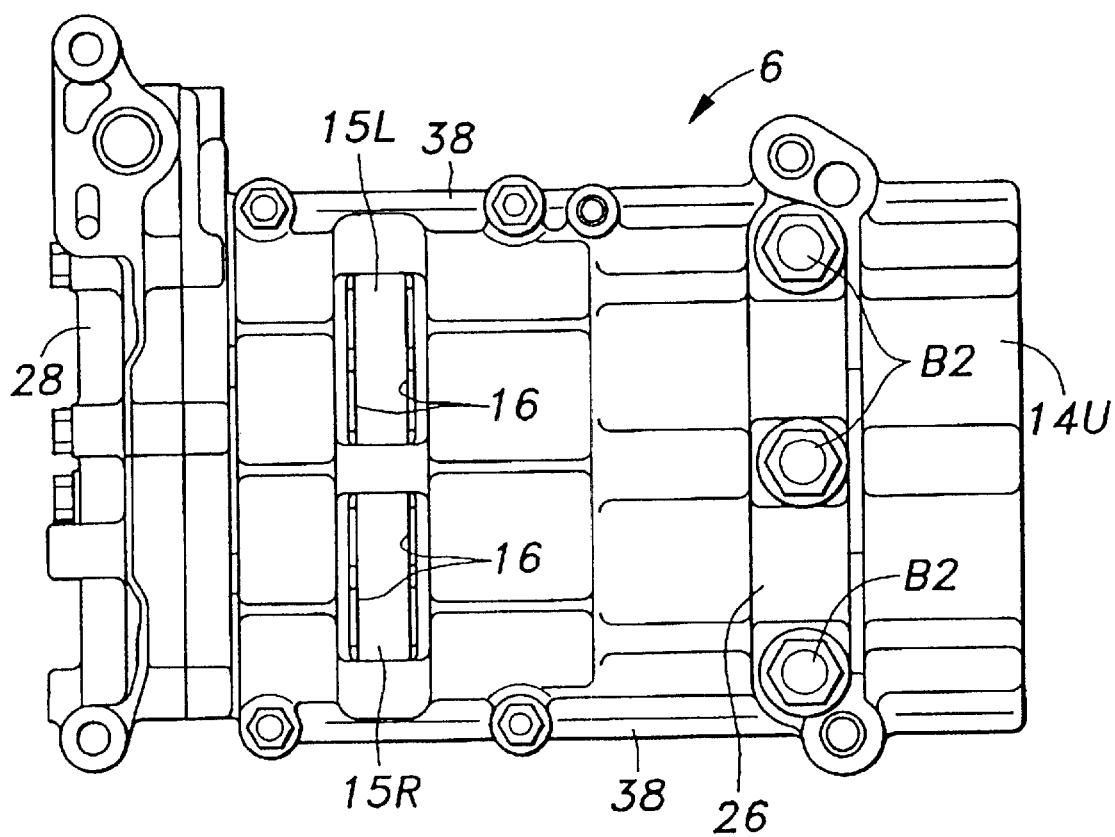
FIG. 12 is a top view showing the balancing device shown in FIG. 11.

As shown in FIG. 10, a bearing hole 40 supporting the first journal portion 17 can be formed at the dividing plane between the upper and lower housings 14U, 14L. According to this configuration, since the dividing planes of the respective bearings for the first and second journal portions 17, 18 can be used commonly, the axial centers of the respective bearings can be aligned with each other with increased accuracy. Moreover, as shown in FIGS. 11 and 12, the front and rear bearing walls can be connected to each other by the eaves-like projecting portions 38 by allowing the eaves-like projecting portions 38 to extend to the supporting portion of the first journal portion 17, thus making it possible to increase the rigidity of the front and rear bearing walls.

The balancing device 6 constructed as described heretofore is fastened to the lower block 5 from below with bolts B3, as shown in FIG. 4.

Thus, as is clear from what has been described heretofore, according to the invention, the intake passage of the pump for taking in lubricating oil within the oil pan is formed integrally with the housing for accommodating the balance shafts, and the oil strainer attaching portion is formed integrally with the bearing wall for supporting the balance shafts. Consequently, since the thickness of the oil strainer attaching portion increases the rigidity of the bearing portion of the balance shafts, the construction according to the invention is greatly advantageous in attaining the required high rigidity for the housings without increasing the thickness of the housings for the sole purpose of increasing the rigidity.

In addition, since the intake passage and the oil strainer attaching portion are formed continuously along the axes of the balance shafts, when there are a plurality of bearings for the balance shafts, there can be provided a configuration in which the plurality of bearings can be connected to each other by the intake passage and the oil strainer attaching portion. Accordingly, the rigidity at the bearing portions can be further increased.

While only certain embodiments of the invention have been specifically described herein, it will apparent that numerous modifications may be made thereto without departing from the spirit and scope of the invention.

What is claimed is:

1. A balance shaft housing disposed in an oil pan, for accommodating at least one balance shaft provided with counterweights,
   wherein said balance shaft housing surrounds said counterweights,
   wherein an intake passage of a pump for taking in lubricating oil within said oil pan is formed integrally with said housing, and
   wherein an attaching portion of an oil strainer is formed integrally with a bearing wall of said housing, said bearing wall arranged for supporting said at least one balance shaft.

2. A balance shaft housing according to claim 1, wherein an upper end portion of said intake passage is provided above a lower end portion of said housing.

3. A balance shaft housing disposed in an oil pan, for accommodating a plurality of balance shafts provided with counterweights,
   wherein an intake passage of a pump for taking in lubricating oil within said oil pan is formed integrally with said housing,
   wherein an attaching portion of an oil strainer is formed integrally with a bearing wall of said housing, said bearing wall arranged for supporting said at least one balance shaft, and
   wherein said intake passage and said attaching portion of said oil strainer are formed continuously along axes of said balance shafts, and wherein a plurality of bearing walls for supporting said balance shafts are connected to each other by said intake passage and said oil strainer attaching portion.

4. A balance shaft housing according to claim 3, wherein said intake passage is provided between said two balance shafts.

5. A balance shaft housing according to claim 4, wherein an upper end portion of said intake passage is provided above a lower end portion of said housing.

6. A balance shaft housing according to claim 3, wherein said balance shaft housing comprises an upper housing and a lower housing, and wherein said upper and lower housings are fastened together at a position of said bearing wall by a plurality of bolts.

7. A balance shaft housing according to claim 3, wherein a pin-like projection is provided to extend toward a bottom surface of an intake port where said oil strainer is provided.

8. A balance shaft housing according to claim 7, wherein said projection and an inner circumferential surface of said attaching portion of said oil strainer are connected to each other by a rib.

9. A balance shaft housing disposed in an oil pan, for accommodating two balance shafts provided with counterweights,
   wherein an intake passage of a pump for taking in lubricating oil within said oil pan is formed integrally with said housing,
   wherein an attaching portion of an oil strainer is formed integrally with a bearing wall of said housing, said bearing wall arranged for supporting said two balance shafts, and
   wherein said intake passage is provided between said two balance shafts.

10. A balance shaft housing according to claim 9, wherein an upper end portion of said intake passage is provided above a lower end portion of said housing.

11. A balance shaft housing according to claim 10, wherein said balance shaft housing comprises an upper housing and a lower housing, and wherein said upper and lower housings are fastened together at a position of said bearing wall by a plurality of bolts.

12. A balance shaft housing according to claim 10, wherein a pin-like projection is provided to extend toward a bottom surface of an intake port where said oil strainer is provided.

13. A balance shaft housing disposed in an oil pan, for accommodating at least one balance shaft provided with counterweights,
   wherein an intake passage of a pump for taking in lubricating oil within said oil pan is formed integrally with said housing,
   wherein an attaching portion of an oil strainer is formed integrally with a bearing wall of said housing, said bearing wall arranged for supporting said at least one balance shaft,
   wherein an upper end portion of said intake passage is provided above a lower end portion of said housing, and
   wherein said balance shaft housing comprises an upper housing and a lower housing, and wherein said upper and lower housings are fastened together at a position of said bearing wall by a plurality of bolts.

14. A balance shaft housing according to claim 13, wherein a pin-like projection is provided to extend toward a bottom surface of an intake port where said oil strainer is provided.

15. A balance shaft housing according to claim 14, wherein said projection and an inner circumferential surface of said attaching portion of said oil strainer are connected to each other by a rib.

16. A balance shaft housing disposed in an oil pan, for accommodating at least one balance shaft provided with counterweights,
   wherein an intake passage of a pump for taking in lubricating oil within said oil pan is formed integrally with said housing,
   wherein an attaching portion of an oil strainer is formed integrally with a bearing wall of said housing, said bearing wall arranged for supporting said at least one balance shaft, and
   wherein said balance shaft housing comprises an upper housing and a lower housing, and wherein said upper and lower housings are fastened together at a position of said bearing wall by a plurality of bolts.

17. A balance shaft housing according to claim 16, wherein a pin-like projection is provided to extend toward a bottom surface of an intake port where said oil strainer is provided.

18. A balance shaft housing according to claim 17, wherein said projection and an inner circumferential surface of said attaching portion of said oil strainer are connected to each other by a rib.

19. A balance shaft housing disposed in an oil pan, for accommodating at least one balance shaft provided with counterweights,
   wherein an intake passage of a pump for taking in lubricating oil within said oil pan is formed integrally with said housing,
   wherein an attaching portion of an oil strainer is formed integrally with a bearing wall of said housing, said bearing wall arranged for supporting said at least one balance shaft, and
   wherein a pin-like projection is provided to extend toward a bottom surface of an intake port where said oil strainer is provided.

20. A balance shaft housing according to claim 19, wherein said projection and an inner circumferential surface of said attaching portion of said oil strainer are connected to each other by a rib.

21. A balance shaft housing disposed in an oil pan, for accommodating at least one balance shaft provided with counterweights,
   wherein said housing and an intake passage of a pump for taking in lubricating oil within said oil pan are formed as a single member, and
   wherein an attaching portion of an oil strainer and a bearing wall of said housing are formed as said single member, said bearing wall arranged for supporting said at least one balance shaft.

22. A balance shaft housing according to claim 21, wherein said at least one balance shaft comprises a plurality of balance shafts, said intake passage and said attaching portion of said oil strainer are formed continuously along axes of said balance shafts, and wherein a plurality of bearing walls for supporting said balance shafts are connected to each other by said intake passage and said oil strainer attaching portion.

23. A balance shaft housing according to claim 21, wherein said at least one balance shaft comprises two balance shafts, and said intake passage is provided between said two balance shafts.

24. A balance shaft housing according to claim 21, wherein an upper end portion of said intake passage is provided above a lower end portion of said housing.

25. A balance shaft housing according to claim 21, wherein said balance shaft housing comprises an upper housing and a lower housing, and wherein said upper and lower housings are fastened together at a position of said bearing wall by a plurality of bolts.

26. A balance shaft housing according to claim 21, wherein a pin-like projection is provided to extend toward a bottom surface of an intake port where said oil strainer is provided.

27. A balance shaft housing disposed in an oil pan, for accommodating at least one balance shaft provided with counterweights, wherein an intake passage of a pump for taking in lubricating oil within said oil pan is formed integrally with said housing, wherein an attaching portion of an oil strainer is formed integrally with a bearing wall of said housing, said housing wall arranged for supporting said at least one balance shaft, and wherein an upstream end portion of the intake passage of said pump is formed integrally with said housing.

28. A balance shaft housing according to claim 27, wherein said at least one balance shaft comprises a plurality of balance shafts, said intake passage and said attaching portion of said oil strainer are formed continuously along axes of said balance shafts, and wherein a plurality of bearing walls for supporting said balance shafts are connected to each other by said intake passage and said oil strainer attaching portion.

29. A balance shaft housing according to claim 27, wherein said at least one balance shaft comprises two balance shafts, and said intake passage is provided between said two balance shafts.

30. A balance shaft housing according to claim 27, wherein an upper end portion of said intake passage is provided above a lower end portion of said housing.

31. A balance shaft housing according to claim 27, wherein said balance shaft housing comprises an upper housing and a lower housing, and wherein said upper and lower housings are fastened together at a position of said bearing wall by a plurality of bolts.

32. A balance shaft housing according to claim 27, wherein a pin-like projection is provided to extend toward a bottom surface of an intake port where said oil strainer is provided.

* * * * *